(12) United States Patent
Brown et al.

(10) Patent No.: US 11,700,841 B1
(45) Date of Patent: Jul. 18, 2023

(54) ADJUSTABLE FISHING TIP-UP STAND

(71) Applicants: Gerald Douglas Bryce Brown, Minden (CA); Steven Henry Norman Draker, Minden (CA)

(72) Inventors: Gerald Douglas Bryce Brown, Minden (CA); Steven Henry Norman Draker, Minden (CA)

( * ) Notice: Subject to any disclaimer, the term of this patent is extended or adjusted under 35 U.S.C. 154(b) by 0 days.

(21) Appl. No.: 17/668,623

(22) Filed: Feb. 10, 2022

(51) Int. Cl.
*A01K 97/01* (2006.01)

(52) U.S. Cl.
CPC .................................. *A01K 97/01* (2013.01)

(58) Field of Classification Search
CPC ........ A01K 97/01; A01K 97/10; A01K 97/12; A01K 97/00
USPC .............................................................. 43/17
See application file for complete search history.

(56) References Cited

U.S. PATENT DOCUMENTS

| | | | | |
|---|---|---|---|---|
| 3,041,770 A * | 7/1962 | Witbro | .................... | A01K 97/01 43/17 |
| 3,190,026 A * | 6/1965 | Roszak | .................... | H03B 7/06 43/17 |
| 4,373,287 A * | 2/1983 | Grahl | ..................... | A01K 97/01 43/17 |
| 4,620,387 A * | 11/1986 | Bloom | ................... | A01K 97/01 43/17 |
| 5,050,333 A * | 9/1991 | Debreczeni | ............ | A01K 97/10 43/16 |
| 6,622,421 B1 * | 9/2003 | Daniels | .................. | A01K 97/01 43/4.5 |
| 8,931,203 B2 * | 1/2015 | Baugh | .................... | A01K 97/01 43/4.5 |

* cited by examiner

*Primary Examiner* — Timothy D Collins
*Assistant Examiner* — Maria E Graber
(74) *Attorney, Agent, or Firm* — Capehart Law Firm

(57) ABSTRACT

A tip-up system includes a base, a telescopic stand, a paddle fastener and a paddle. The tip-up system improves the process of finding a point of balance of the paddle of the tip-up stand. Particularly, the paddle includes a horizontal cavity and a pivot bar attached therewithin. The paddle pivots between a balanced position and a tipped position via the pivot bar. The pivot bar is movable within the horizontal cavity to allow a user to adjust a balance point of the paddle and thus find the correct point of balance for the paddle when in use with a fishing line and hook.

20 Claims, 11 Drawing Sheets

ADJUSTABLE FISHING TIP-UP STAND

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of fishing of existing art and more specifically relates to a tip-up stand with point of balance adjustability.

RELATED ART

Fishing is the activity of trying to catch fish. It is an ancient practice performed for a variety of reasons, from recreational purposes to commercial purposes. Ice fishing is a particular form of catching fish that utilizes lines and fishhooks or spears through an opening in a sheet of ice on a frozen body of water. Ice fishing typically requires the use of specialized equipment. Particularly, tip-ups are devices usually including a paddle/movable arm and/or flag and used to suspend bait in the body of water. The paddle/movable arm and/or flag tips up or down to alert an angler that a fish has been caught. Thus, tip-ups allow the angler to manage multiple openings at once.

It is vital to properly balance a paddle/movable arm of the tip-up as it is of importance to the use of a tip-up that only the pulling of a caught fish causes the paddle/movable arm to become unbalanced (causing it to tip and alert the angler). However, it is often difficult to balance the flag/paddle of existing tip-ups as a variety of factors influence the balance. For example, contours of a lakebed, weight of the fishing hook, etc. As such, a suitable solution is desired.

SUMMARY OF THE INVENTION

In view of the foregoing disadvantages inherent in the known ice fishing equipment art, the present disclosure provides a novel adjustable tip-up stand. The general purpose of the present disclosure, which will be described subsequently in greater detail, is to provide a tip-up stand that includes a means for adjusting a balance point such that a user is easily able to find a point of balance for a paddle of the tip-up stand.

A tip-up system is disclosed herein. The tip-up system may be used particularly in ice fishing to alert a user as to a catch status of a fishing hook. The fishing hook may be attached to an end of a fishing line. The tip-up system may be placed over an ice surface adjacent an opening in the ice surface, the ice surface defining a horizontal axis. The opening may provide access to a body of water underneath the ice surface for inserting the fishing hook thereinto for fishing. The tip-up system may include a base, a telescopic stand, a paddle fastener and a paddle.

The base may include a base body having a front base end opposite a rear base end, a first base side opposite a second base side, a top base surface opposite a bottom base surface, at least one stand fastener and at least one anchor point configured to facilitate fastening of the base to the ice surface. The first base side and the second base side may extend between the front base end and the rear base end. The base may be substantially parallel to the horizontal axis when attached thereto. The telescopic stand may be pivotably attached to the base and configured to pivot between a raised position and a collapsed position relative to the base, the telescopic stand may be substantially perpendicular to the base in the raised position and define a stand axis perpendicular to the horizontal axis. The telescopic stand may be substantially parallel to the base in the collapsed position.

The telescopic stand may include at least a first stand portion and a second stand portion. The first stand portion may include a first lower end opposite a first upper end, a first length therebetween, and a first substantially hollow interior. The first lower end may include at least one base fastener for pivotably attaching the telescopic stand to the base. The second stand portion may include a second lower end opposite a second lower end and a second lower end therebetween. The second lower end may be attached about the first upper end of the first stand portion and configured for slidable insertion into the first substantially hollow interior, thereby adjusting a height of the telescopic stand. The paddle fastener may be attached atop the telescopic stand. The paddle fastener may include a fastener body and at least one rounded aperture therewithin defining a pivot axis at least substantially perpendicular to the stand axis.

The paddle may be configured to receive the fishing line. The paddle body may include a front paddle end opposite a rear paddle end, a first paddle side opposite a second paddle side extending between the front paddle end and the rear paddle end, a top paddle surface opposite a bottom paddle surface. An elongated horizontal cavity may be disposed within the paddle body and extend through the first paddle side and the second paddle side, and a pivot bar may be attached within the elongated horizontal cavity. The front paddle end may be oriented proximal to the opening in the ice surface and configured to hold the fishing hook in the body of water. The pivot bar may be configured to sit within the at least one rounded aperture such that the paddle is able to pivot about the pivot axis between a balanced position and a tipped position. The pivot bar may further be configured for linear movement along the elongated horizontal cavity to adjust a balance point of the paddle.

According to another embodiment, a method of using a tip-up system is also disclosed herein. The method includes providing the tip-up system as above; placing the base over the ice surface; securing the base to the ice surface using the at least one anchor point; manipulating the second stand portion to adjust height of the telescopic stand; attaching the fishing line to the paddle with fishing hook hanging over the front paddle end; lowering the fishing hook into the body of water; and selectively moving the pivot bar along the elongated horizontal until the paddle is placed into the balanced position.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an adjustable fishing tip-up stand, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a tip-up stand and more particularly to an adjustable tip-up stand as used in ice fishing to improve the process of finding a balance point of a paddle of the tip-up stand. Particularly, the adjustable tip-up stand may include a base and an adjustable stand comprising three pieces. A top of the paddle may include an adjustable balance point to find a perfect balance for adjusting to contours of a lake floor (and the like).

Figure 1:
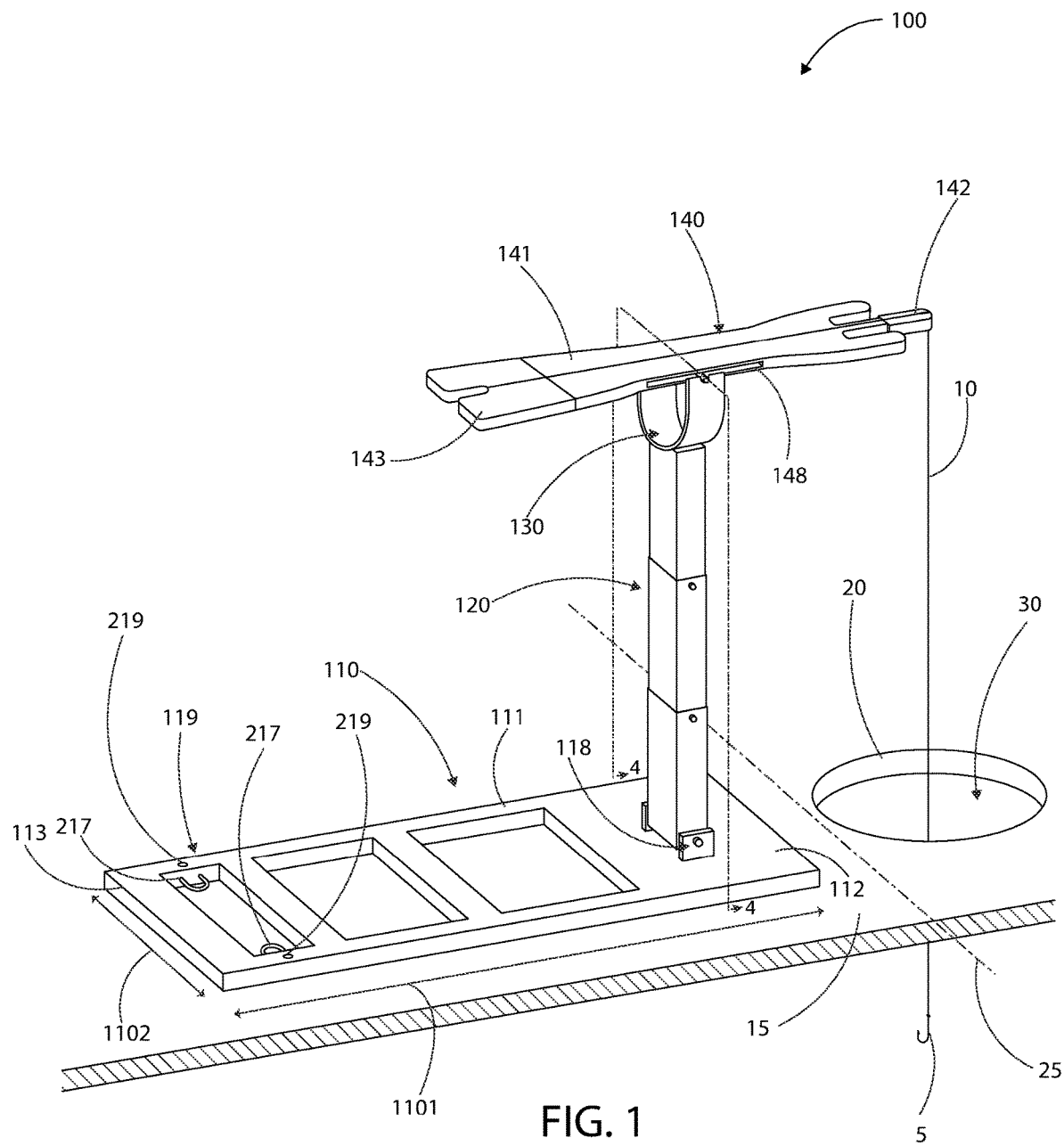
FIG. 1 is a perspective view of the tip-up system being used for ice fishing, according to an embodiment of the disclosure.

Referring now more specifically to the drawings by numerals of reference, there is shown in FIGS. 1-12, various views of a tip-up system 100. Preferably, the tip-up system 100 may be used in ice fishing to alert a user as to a catch status of a fishing hook 5 (i.e., to alert the user when a fish has been caught on the fishing hook 5). The fishing hook 5 may be attached to an end of a fishing line 10, as shown in FIG. 1. Further, as shown in FIG. 1, when used in ice fishing, the tip-up system 100 may be placed over an ice surface 15 adjacent an opening 20 in the ice surface 15 (previously made by the user) to access a body of water 30 underneath the ice surface 15 such that the user may insert the fishing hook 5 therein to fish in the body of water 30.

As shown in FIG. 1, the tip-up system 100 may include a base 110, a telescopic stand 120, a paddle fastener 130 and a paddle 140. As shown, the fishing line 10 may be attached to the paddle 140. In some embodiments, the fishing line 10 may be wound around a fishing line spool (not illustrated) and the fishing line spool may be attached to the paddle 140. In other embodiments still, the paddle 140 may be configured to receive a fishing rod (not illustrated).

Further, as shown in FIG. 1, the ice surface 15 may define a horizontal axis 25 and the base 110 may be placed substantially parallel to the horizontal axis 25. The base 110 may include a base body 111 having a front base end 112 opposite a rear base end 113, a first base side 114 opposite a second base side 115 and a top base surface 116 opposite a bottom base surface 117 (which contacts the ice surface 15 when the base is placed thereover). As shown, in some embodiments, the base 110 may include cut out sections extending through the top base surface 116 and the bottom base surface 117. The base 110 may include a length 1101 of 12 inches, as measured from the front base end 112 to rear the base end 113; and a width 1102 of 6 inches, as measured from the first base side 114 to the second base side 115 (shown in FIG. 2). It should however be appreciated that these measurements are given as examples only and are not limited to the measurements given here.

Further, as shown in FIG. 1, the base 110 may include at least one anchor point 119. The at least one anchor point 119 may be configured to facilitate fastening of the base 110 to the ice surface 15. In some embodiments, the at least one anchor point 119 may include two rings 217 located opposite each other toward the rear base end 113 of the base 110 (as shown in FIG. 1). For example, as shown, the two rings 217 may be each be a D-ring. Further, in some embodiments, the at least one anchor point 119 may further include two apertures 219 located opposite each toward the rear base end 113 (again, as shown in FIG. 1). The rings 217 and the apertures 219 may provide anchor points for the user to attach anchoring means thereby securing the tip-up system 100 to the ice surface.

As shown in FIGS. 1-5, the base 110 may further include at least one stand fastener 118. In addition, in some embodiments, the base may include a raised section 218 and the at least one stand fastener 118 may be attached to the raised section 218. In some embodiments, the at least one stand fastener 118 may include two protrusions 216 (FIG. 4) located on opposite sides of the raised section 218. The two protrusions 216 may preferably include female threads. In some other embodiments, the at least one stand fastener 118 may include two apertures instead of two protrusions 216, and the two apertures may include the female threads.

Figure 4:
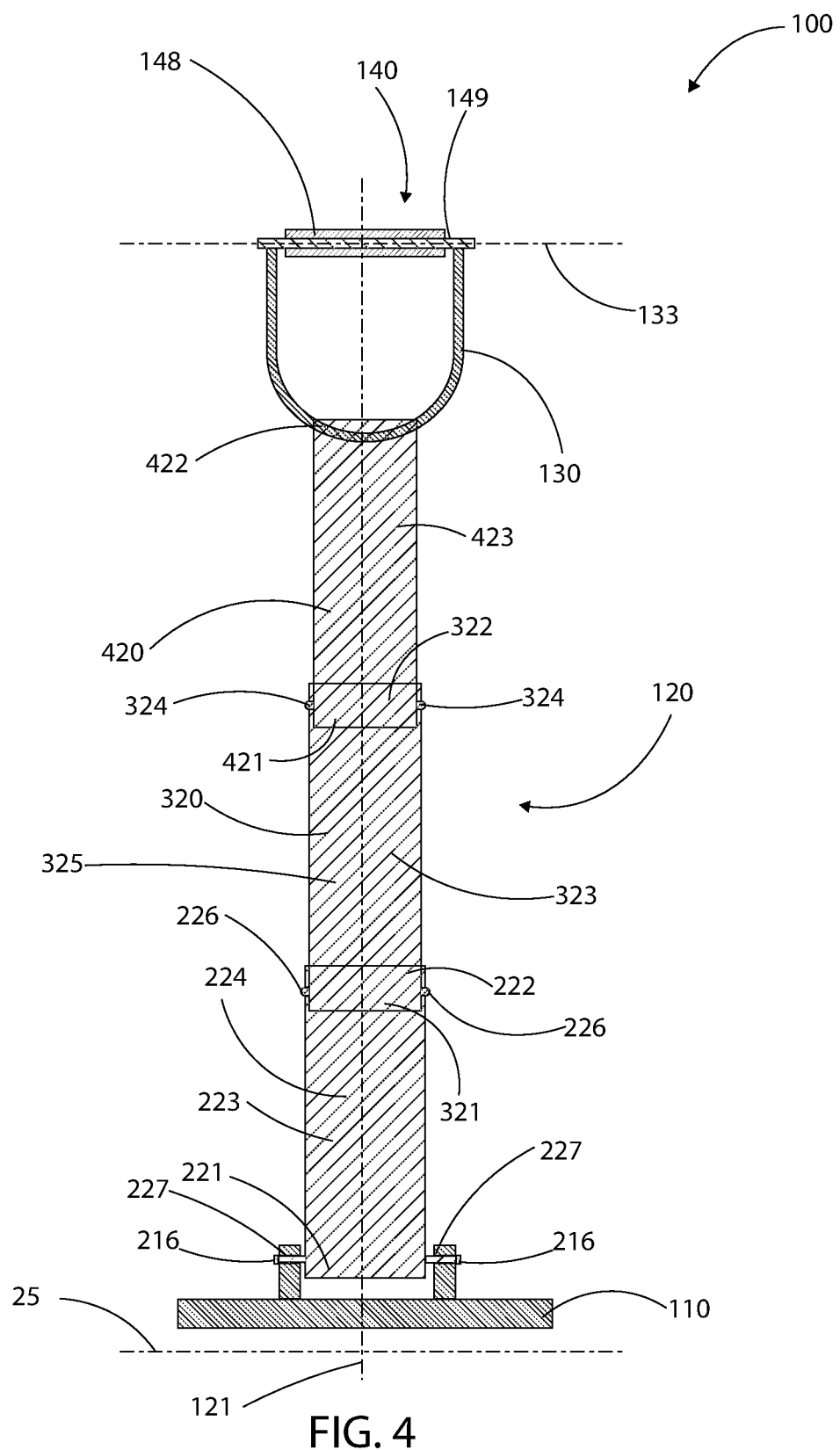
FIG. 4 is a cross-sectional view of the tip-up system taken from line 4-4 in FIG. 1 and illustrating the telescopic stand pivotably attached to the base, the second stand portion attached to the first stand portion, the third stand portion attached to the second stand portion, and a pivot axis relative to a stand axis and a horizontal axis, according to an embodiment of the present disclosure.
Figure 5:
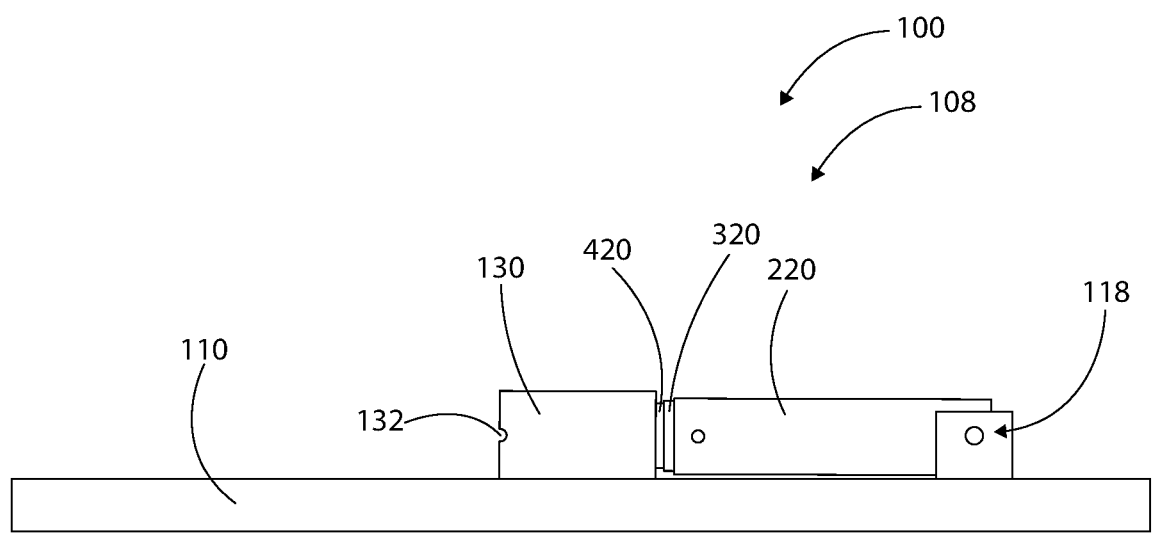
FIG. 5 is a side view of the tip-up system in a collapsed position, the telescopic stand having been pivoted relative to the base, the third stand portion inserted into the second stand portion and the second stand portion inserted into the first stand portion, according to an embodiment of the present disclosure.

As shown in FIGS. 1-5, the telescopic stand 120 may be pivotably attached to the base 110 and configured to pivot between a raised position 107 and a collapsed position 108 relative to the base 110. As shown in FIGS. 1-4, in the raised position 107 the telescopic stand 120 may be substantially perpendicular to the base 110 and may define a stand axis 121 perpendicular to the horizontal axis 25 (FIG. 4). As shown in FIG. 5, the telescopic stand 120 may be substantially parallel to the base 110 in the collapsed position 108, thereby allowing the tip-up system 100 to be easily transported. Preferably, when in the collapsed position 108, the tip-up system 100 may fit into a standard backpack.

In some embodiments, the telescopic stand 120 may include a first stand portion 220 having a first lower end 221 opposite a first upper end 222, a first length 223 therebetween, and a first substantially hollow interior 224. As shown in FIGS. 1-5, the first lower end 221 may include at least one base fastener 225 for pivotably attaching the telescopic stand 120 to the base 110. As above, the at least one stand fastener 118 may include two protrusions 216 (or two apertures). As shown, the at least one base fastener 225 may include two pivot arms 227 (FIG. 4) located on opposite sides of the first stand portion 220 and each configured to attach to one of the two protrusions 216 (one pivot arm 227 connecting to one protrusion 216). The pivot arms 227 may act as a hinge for the first stand portion 220 and allow the telescopic stand 120 to easily pivot between the raised position 107 (FIGS. 1-4) and the collapsed position 108 (FIG. 5).

Similar to the first stand portion 220, the second stand portion 320 may include a second lower end 321 opposite a second upper end 322 and a second length 323 therebetween. The second lower end 321 may be attached about the first upper end 222 of the first stand portion 220 and configured for slidable insertion into the first substantially hollow interior 224, thereby adjusting a height of the telescopic stand 120. Further, in some embodiments, the second stand portion 320 may include a second substantially hollow interior 325. In this embodiment, the telescopic stand 120 may further include a third stand portion 420. The third stand portion 420 may include a third lower end 421 opposite a third upper end 422 and a third length 423 therebetween. The third lower end 421 may be attached about the second upper end 322 of the second stand portion 320 and configured for slidable insertion into the second substantially hollow interior 324.

Figure 2:
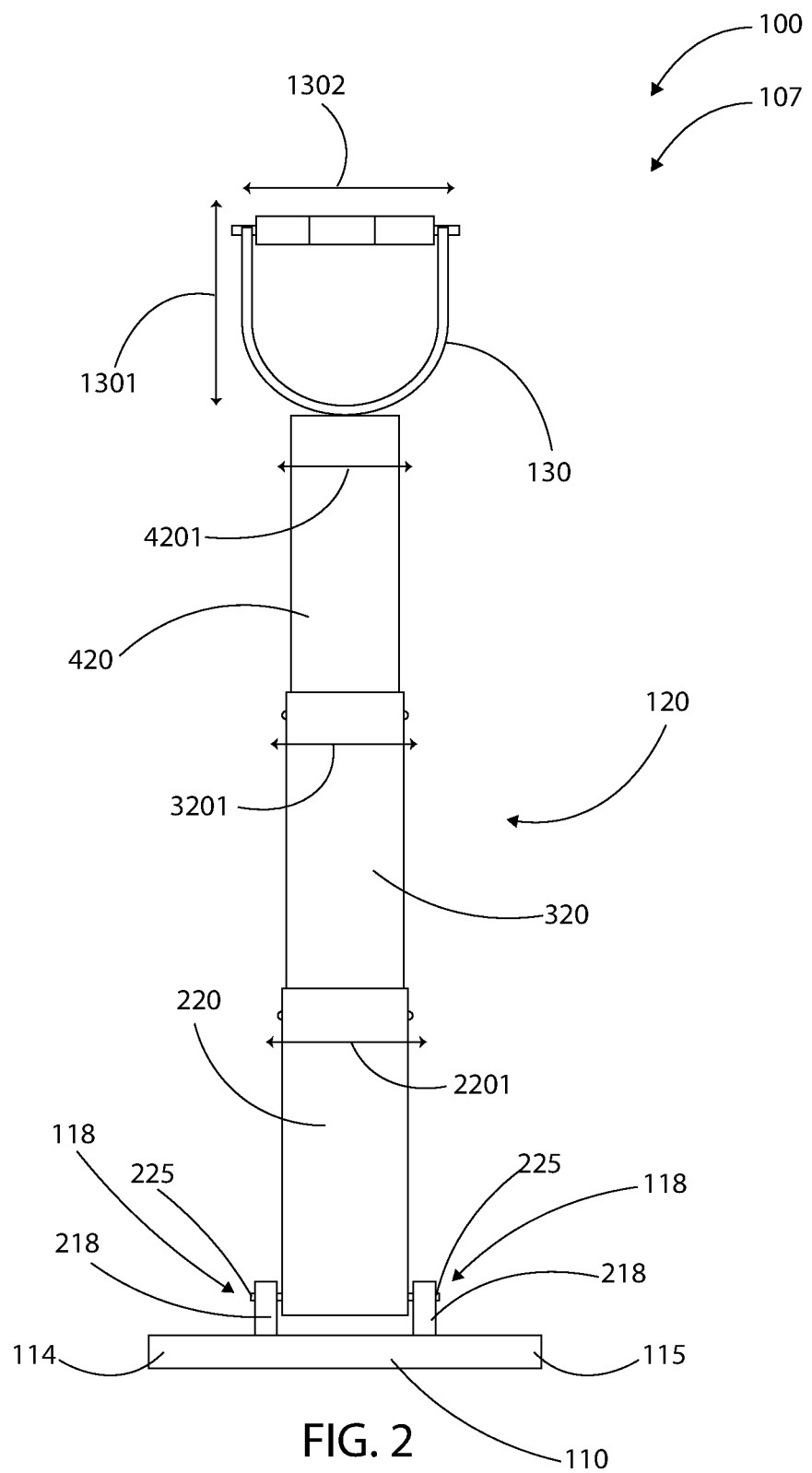
FIG. 2 is a front view of the tip-up system illustrating a telescopic stand in a raised position and including a first stand portion, a second stand portion and a third stand portion, according to an embodiment of the present disclosure.
Figure 3:
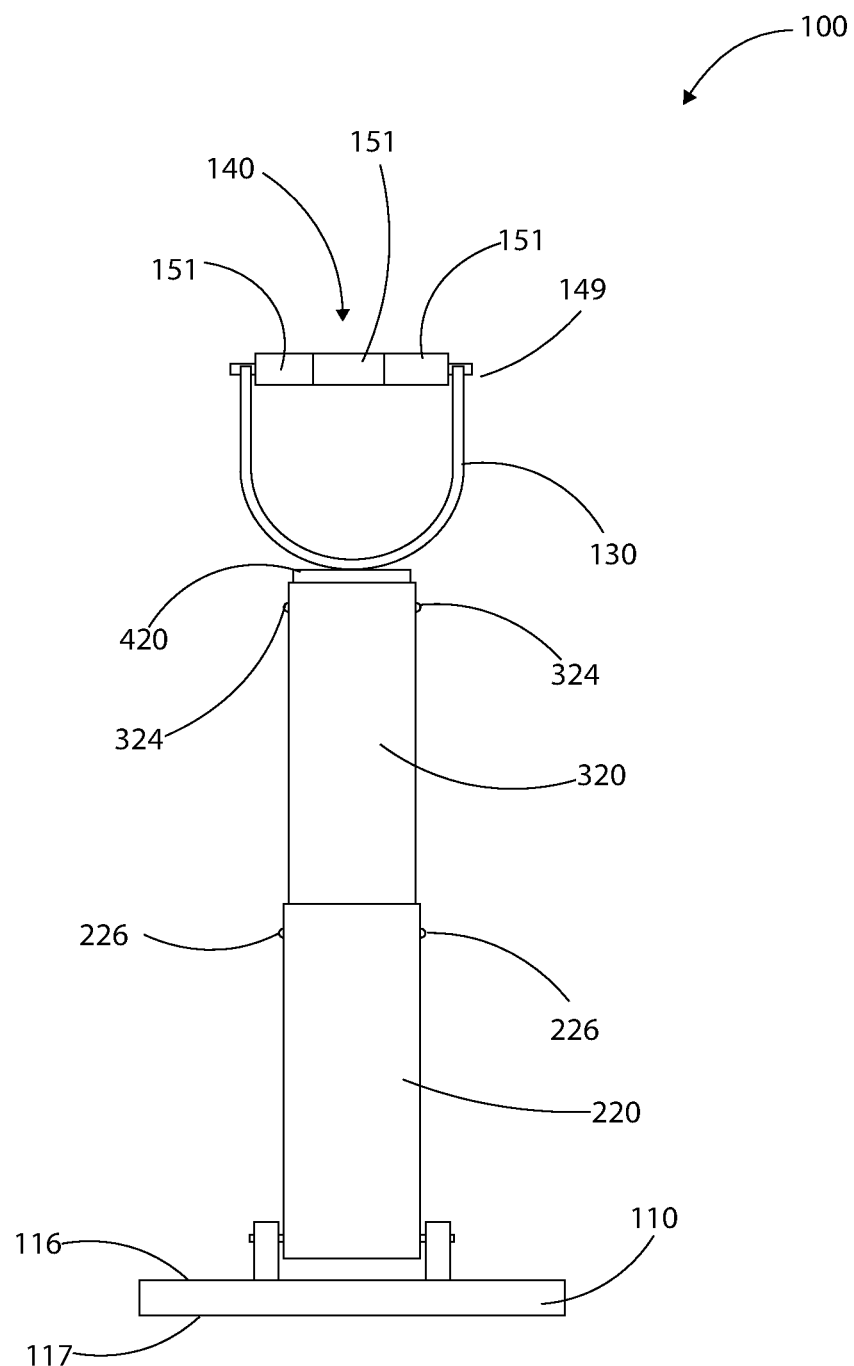
FIG. 3 is a front view of the tip-up system illustrating the telescopic stand with the third stand portion inserted into the second stand portion, according to an embodiment of the present disclosure.

As demonstrated in FIG. 2, In some embodiments, the first stand portion 220 may include a width 2201 of 0.5 inches greater than a width 3201 of the second stand portion 320, and the second stand portion 320 may include the width 3201 0.5 greater than a width 4201 of the third stand portion 420. For example, the first stand portion 220 may include a width of 2 inches; the second stand portion 320 may include a width of 1.5 inches; and the third stand portion 420 may include a width of 1 inch. It should however be appreciated that the stand portions 220, 320, 420 are not limited to these measurements.

In some embodiments, as shown in FIG. 4 particularly, the first stand portion 220 may include first lockable means 226 located about the first upper end 222 and configured for selectively locking the second stand portion 320 relative to the first stand portion 220. For example, the first lockable means 226 may allow the user to lock the second stand portion 320 substantially out of the first stand portion 220 or lock the second stand portion 320 substantially within the first stand portion 220. In some embodiments the first lockable means 226 may lock the second stand portion 320 at varying heights relative to the first stand portion 220 (differing levels of the second stand portion 320 being inserted within the first stand portion 220).

Similarly, the second stand portion 320 may include second lockable means 324 located about the second upper end 322 and configured for selectively locking the third stand portion 420 relative to the second stand portion 320. Again, the second lockable means 324 may allow the user to lock the third stand portion 420 substantially out of the second stand portion 320 or lock the third stand portion 420 substantially within the second stand portion 320. In some embodiments the second lockable means 324 may lock the third stand portion 420 at varying heights relative to the second stand portion 320 (differing levels of the third stand portion 420 being inserted within the second stand portion 320).

In some embodiments, the first lockable means 226 may include the first stand portion 220 having a first threaded aperture at a first side thereof (near to the first upper end 222); a second threaded aperture at a second side thereof (again near to the first upper end 222); a first threaded rod for insertion into the first threaded aperture; and a second threaded rod for insertion into the second threaded aperture. Similarly, the second lockable means 324 may include the second stand portion 320 having a third threaded aperture at a first side thereof (near to the second upper end); a fourth threaded aperture at a second side thereof (again near the second upper end); a third threaded rod for insertion into the third threaded aperture; and a fourth threaded rod for insertion into the fourth threaded aperture. As such, the threaded rods may be inserted into the apertures and selectively tightened and/or loosened against the stand portions 220, 320, 420 located within the substantially hollow interiors 224, 325. It should however be appreciated that the lockable means 226, 324 are not limited to the configuration, mechanism, design, etc. mentioned or shown here.

As shown in FIGS. 1-11, the paddle fastener 130 may be attached atop the telescopic stand 120. The paddle fastener 130 may include a fastener body 131 and at least one rounded aperture 132 therewithin. As shown, the at least one rounded aperture 132 may define a pivot axis 133 (FIG. 4) at least substantially perpendicular to the stand axis 121 (and intersecting therewith as shown in FIG. 4).

Figure 9:
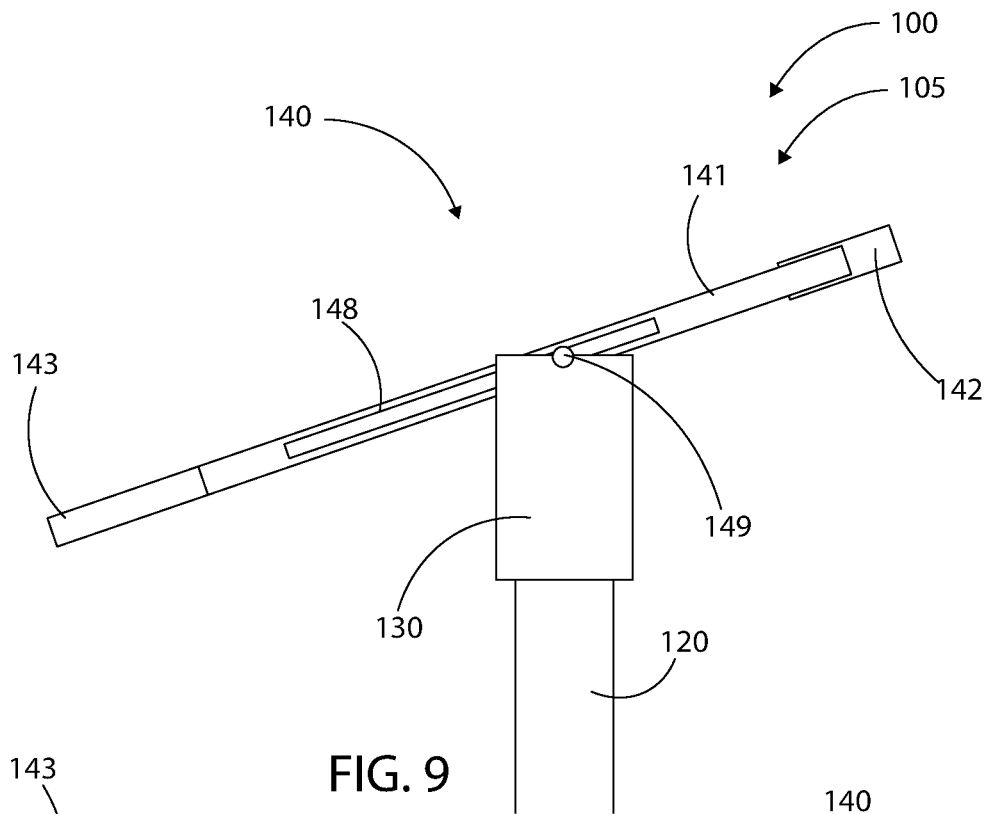
FIG. 9 is a side view of the tip-up system illustrating the paddle in the balanced position and the pivot bar having been moved along the elongated horizontal cavity to adjust a balance point of the paddle, according to an embodiment of the present disclosure.
Figure 10:
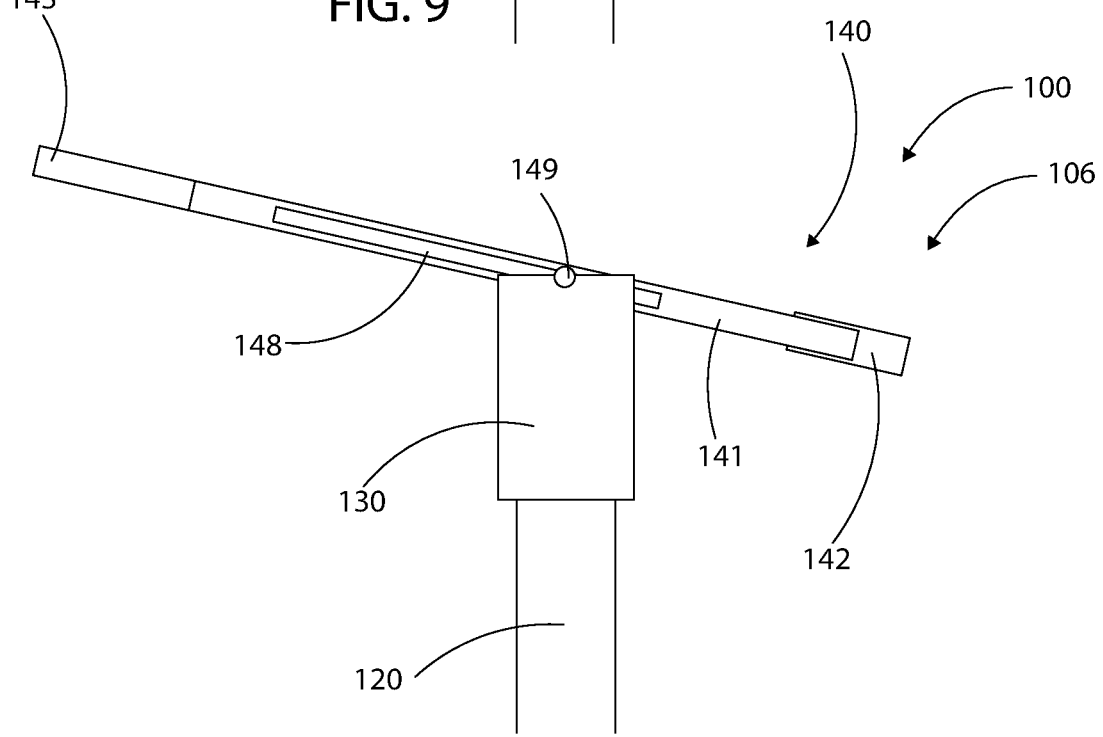
FIG. 10 is a side view of the tip-up system illustrating the paddle in the tipped position and the pivot bar having been moved along the elongated horizontal cavity to adjust the balance point of the paddle, according to an embodiment of the present disclosure.
Figure 11:
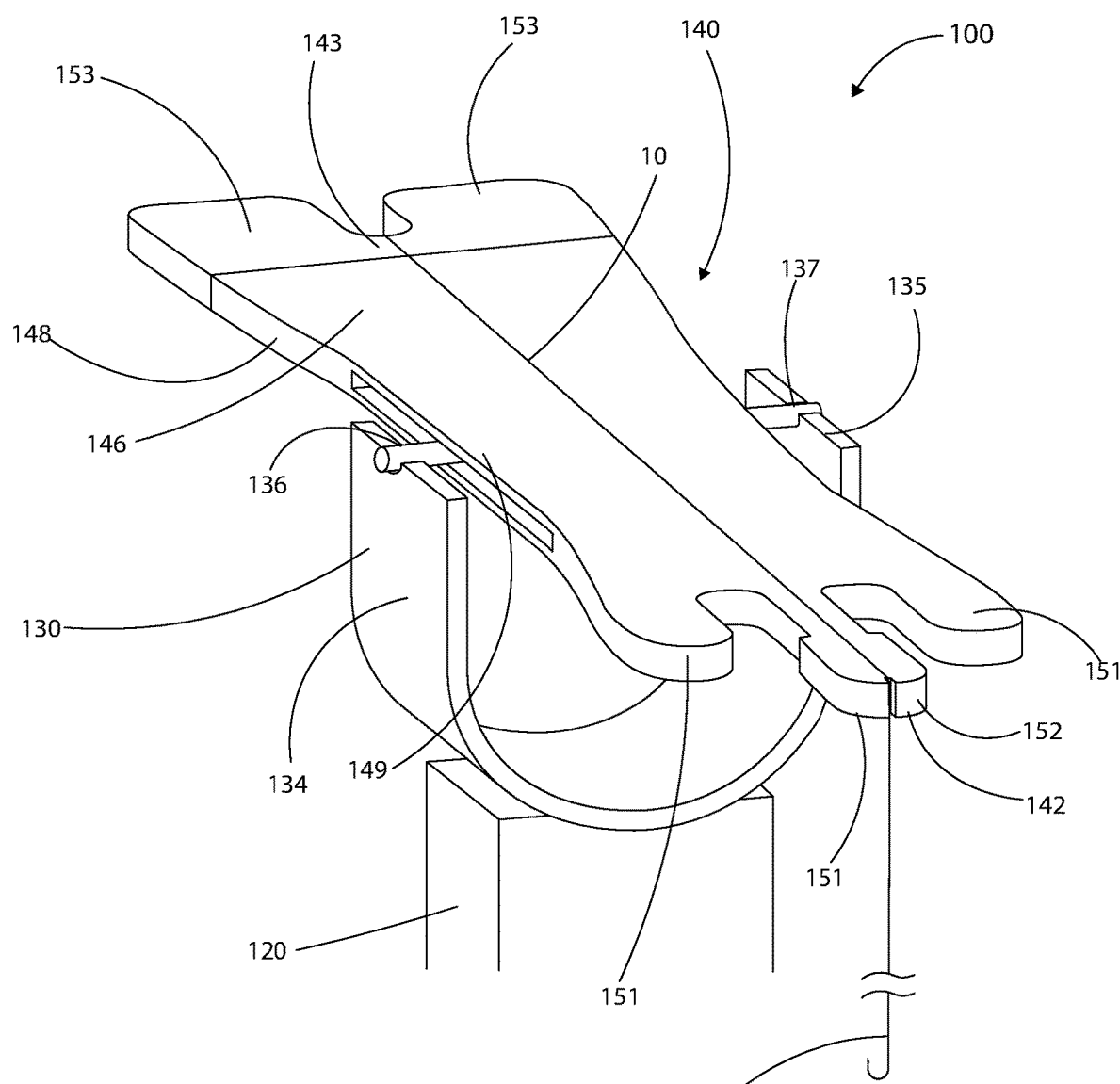
FIG. 11 is a perspective front view of the tip-up system illustrating the paddle having a fishing line threaded thereon, according to an embodiment of the present disclosure.

Referring more specifically to FIGS. 6-12, showing the paddle fastener 130 and the paddle 140. As shown in FIG. 11, the fastener body 131 may include a U-shape having a first arm 134 opposite a second arm 135. In this embodiment, the at least one rounded aperture 132 may include a first aperture 136 located in the first arm 134 of the fastener body 131 and a second aperture 137 located in the second arm 135 of the fastener body 131. As shown, the second aperture 137 may be in line with the first aperture 136. In some embodiments, the first aperture 136 and the second aperture 137 may include a U-shape or a semi-circular shape. In other embodiments, the first aperture 136 and the second aperture 137 may include a circular shape. In some embodiments, the paddle fastener 130 may include a height 1301 (FIG. 2) of 2 inches as measured from a bottom of the arms 134, 135 to a top of the arms 134, 135; and a width 1302 (FIG. 2) of 2 inches as measured from a rear of the first arm 134 to a rear of the second arm 135. It should however be appreciated that these measurements are given as examples only and are not limited to the measurements given here.

As shown in FIG. 1 and FIG. 11 and as discussed above, the paddle 140 may be configured to receive the fishing line 10. Particularly, in some embodiments, the fishing line 10 may be wound around the paddle 140 such that the fishing hook 5 hangs from a front paddle end 142 of the paddle 140. As shown in FIG. 1, the front paddle end 142 may oriented proximal to the opening 20 in the ice surface 15 (a rear paddle end 143 being distal to the opening 20) and configured to hold the fishing hook 5 in the body of water 30.

As shown in FIGS. 6-12, the paddle 140 may include a paddle body 141 having the front paddle end 142 opposite the rear paddle end 143, a first paddle side 144 opposite a second paddle side 145 extending between the front paddle end 142 and the rear paddle end 143 and a top paddle surface 146 opposite a bottom paddle surface 147. The paddle 140 may include a length 1401 of 12 inches as measured from the front paddle end 142 to the rear paddle end 143.

Figure 12:
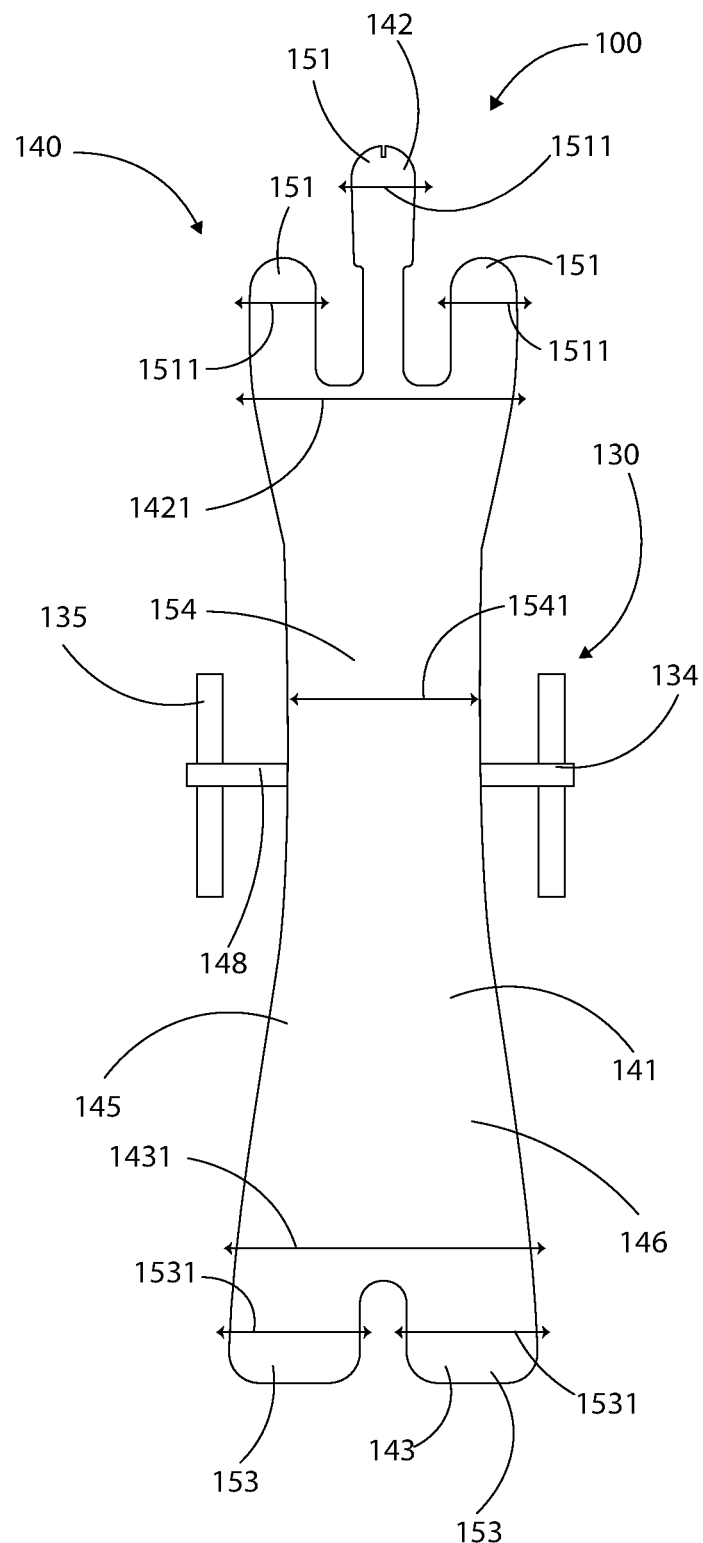
FIG. 12 is a top view of the tip-up system illustrating the paddle, according to an embodiment of the present disclosure.

As shown in FIGS. 11-12 particularly, the paddle may be split into the front paddle end 142, a mid-section 154, and the rear paddle end 143. The paddle 140 may be tapered toward the mid-section 154 of the paddle 140 with the front paddle end 142 and the rear paddle end 143 being wider than the mid-section 154. For example, a narrowest part of the mid-section 154 may include a width 1541 of 1.5 inches. A widest part of the paddle ends 142, 143 may include widths 1421, 1431 of 2 inches (however it should be appreciated that the paddle 140 is not limited to these measurements).

As shown in FIGS. 11-12, the front paddle end 142 may include three prongs 151. A middle prong 152 of the three prongs 151 may include a greater height than the other two prongs 151. In some embodiments, the middle prong 152 may be weighted. This may aid in balancing of the paddle 140 and subsequent tipping of the paddle 140 (when a fish is caught on the fishing hook 5). In some embodiments, the three prongs 151 may include a width 1511 of ½ inches each. Further, in some embodiments, as shown these figures, the rear paddle end 143 may include two flaps 153. The two flaps 153 may work to direct wind and thereby further aid in balancing of the paddle 140. The flaps 153 may each include a width 1531 of ¾ inch. It should however be appreciated that these measurements are given as examples only and are not limited to the measurements given here.

As shown in FIGS. 6-11 particularly, an elongated horizontal cavity 148 may be disposed within the paddle body 141 and may extend through the first paddle side 144 and the second paddle side. A pivot bar 149 may be attached within the elongated horizontal cavity 148. The pivot bar 149 may be configured to sit within the at least one rounded aperture 132 such that the paddle 140 is able to pivot about the pivot axis 133 between a balanced position 105 and a tipped position 106. The pivot bar 149 may further be configured for linear movement along the elongated horizontal cavity 148 to adjust a balance point of the paddle 140 (the balance point being the point at which the paddle 140 is balanced relative to the paddle faster 130 [i.e., in the balanced position 105]). This may enable the user to easily find a point of balance for the paddle 140, as this may change depending on fishing hook 5, depth of body of water 30, lake surface, or the like.

Figure 6:
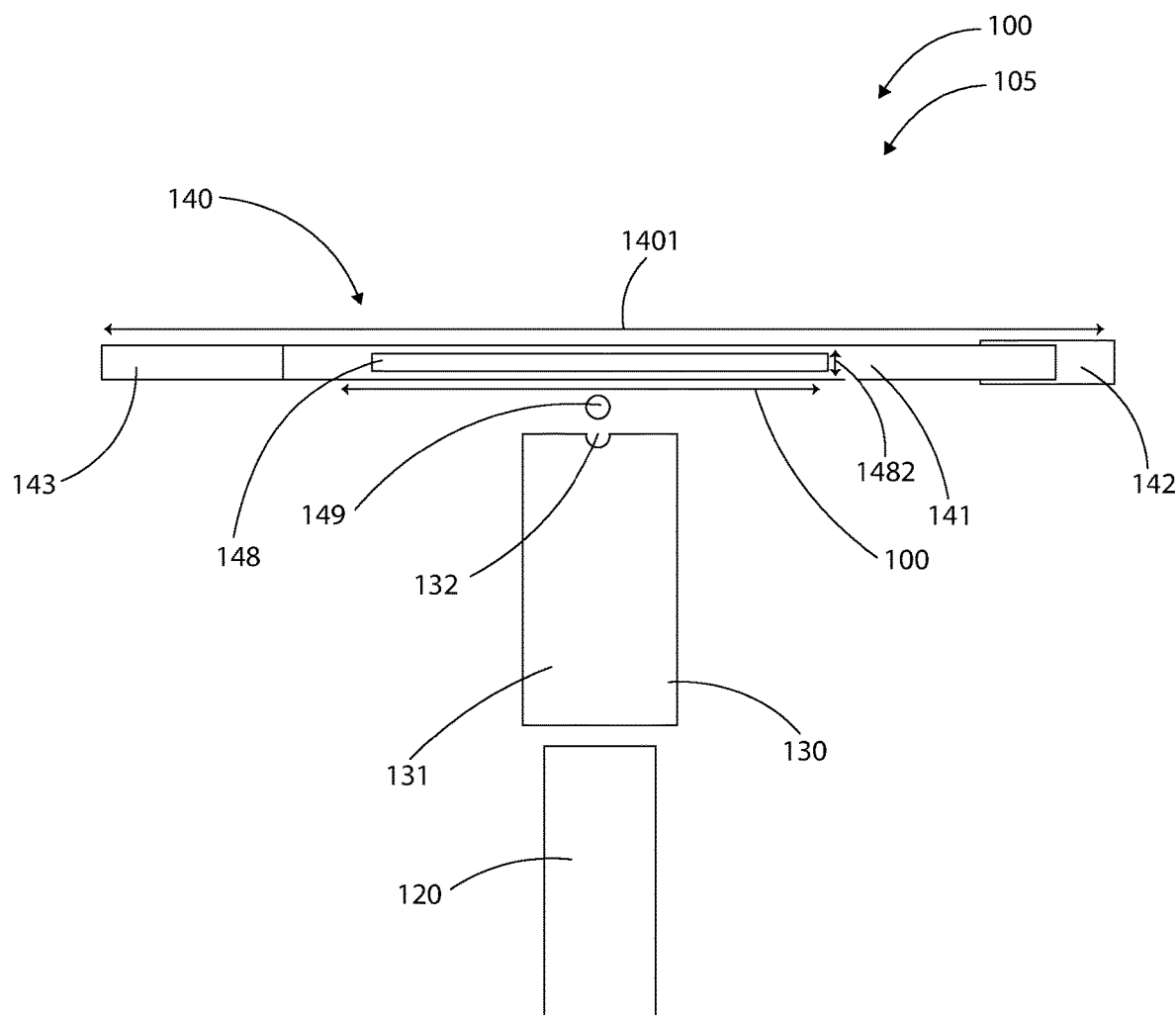
FIG. 6 is an exploded view of the tip-up system illustrating a paddle fastener, a paddle, an elongated horizontal cavity disposed within the paddle, and a pivot bar, according to an embodiment of the present disclosure.
Figure 7:
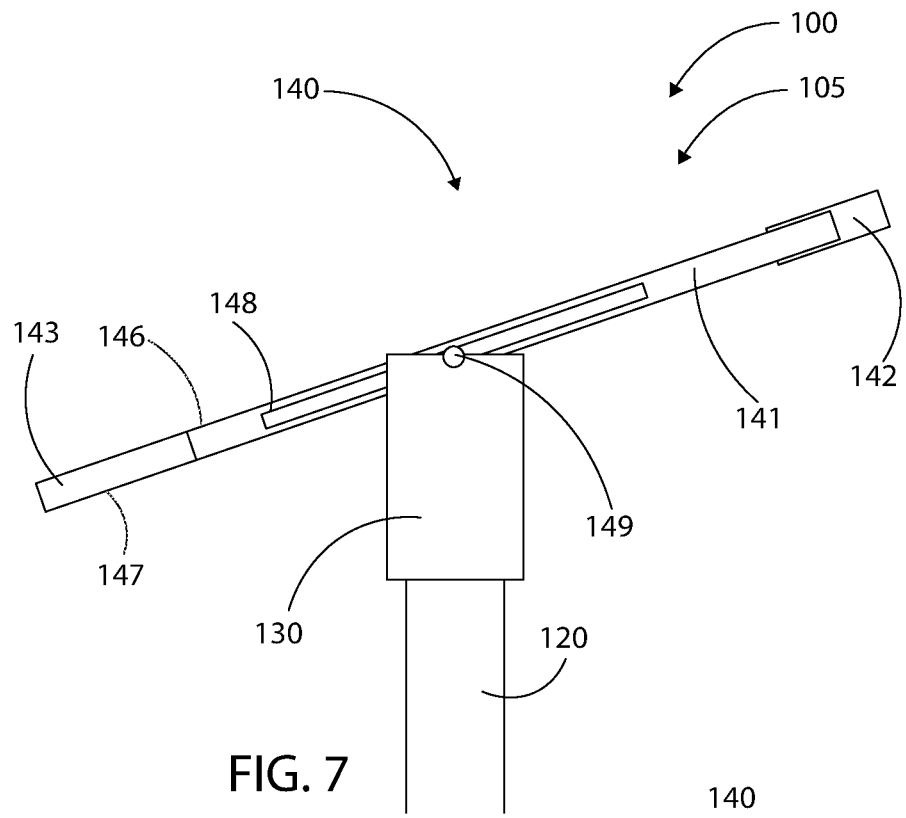
FIG. 7 is a side view of the tip-up system illustrating the paddle in a balanced position, according to an embodiment of the present disclosure.
Figure 8:
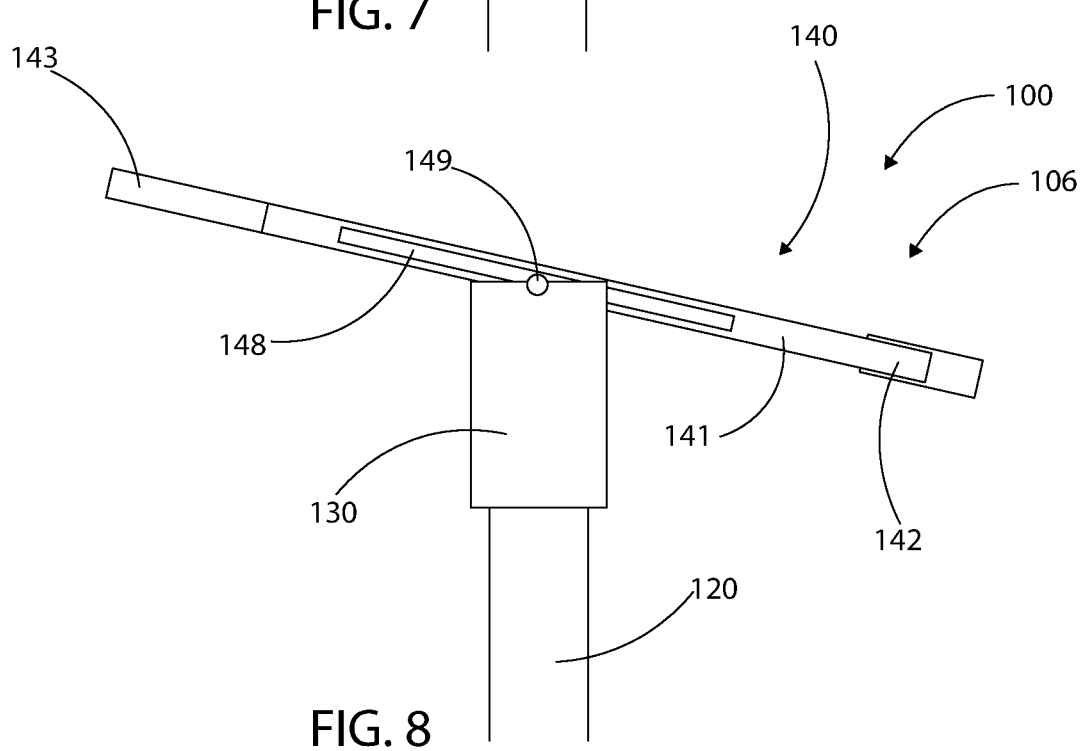
FIG. 8 is a side view of the tip-up system illustrating the paddle in a tipped position, according to an embodiment of the present disclosure.

As shown in FIG. 6, in some embodiments, the balanced position 105 may include the paddle 140 being substantially horizontal and the front paddle end 142 in (horizontal) line with the rear paddle end 143. As shown in FIG. 7 and FIG. 9, in some embodiments, the balanced position 105 may include the paddle 140 being angled and the front paddle end 142 being up (and the rear paddle end 143 being down). When weight is put on the fishing hook 5 (when a fish is caught), it may pull the fishing line 10, which then may pull the front paddle end 142 down, thus pivoting the paddle 140 into the tipped position 106 (FIG. 8 and FIG. 10) and alerting the user that a fish has been caught.

As discussed above, the balance point is the point at which the paddle 140 is placed into the balanced position 105 and the point at which the paddle 140 is placed into the balanced position 105 may change depending on weight of fishing hook 5, depth of body of water 30, body of water surface, or the like. As such, the user may move the pivot bar 149 along the elongated horizontal cavity 148 until the paddle 140 is in the balanced position 105, as demonstrated in FIGS. 7-10 with FIGS. 7-8 showing the pivot bar 149 in one particular position along the elongated horizontal cavity 148 and FIGS. 9-10 showing the pivot bar 149 in another particular position along the elongated horizontal cavity 148—demonstrating that the balance point had to be adjusted in FIGS. 9-10 (again due to circumstances such as weight of fishing hook 5, depth of body of water 30, body of water surface, or the like). Again, FIG. 8 and FIG. 10 show the paddle 140 in the tipped position 106.

As above, the at least one rounded aperture 132 may include the first aperture 136 located in the first arm 134 of the fastener body 131 and the second aperture 137 located in the second arm 135 of the fastener body 131. In this embodiment, a first bar end of the pivot bar 149 may sit within the first aperture 136 and a second bar end of the pivot bar 149 may sit within the second aperture 137 (in line with the pivot axis 133 [FIG. 4]).

In some embodiments, the elongated horizontal cavity 148 may include a length 1481 of between 3-4 inches and a height 1482 of ⅛ inches. As shown, the elongated horizontal cavity 148 may be located about the mid-section 154 of the paddle 140. In some embodiments, the elongated horizontal cavity 148 may include a locking mechanism configured to lock the pivot bar 149 at a particular point (so as to prevent the pivot bar 149 from coming loose from the elongated horizontal cavity 148 and thereby causing the paddle to move from the balanced position 105). For example, the locking mechanism may include (but is not limited to) clamp(s), notch and groove system(s), friction, etc.

Figure 13:
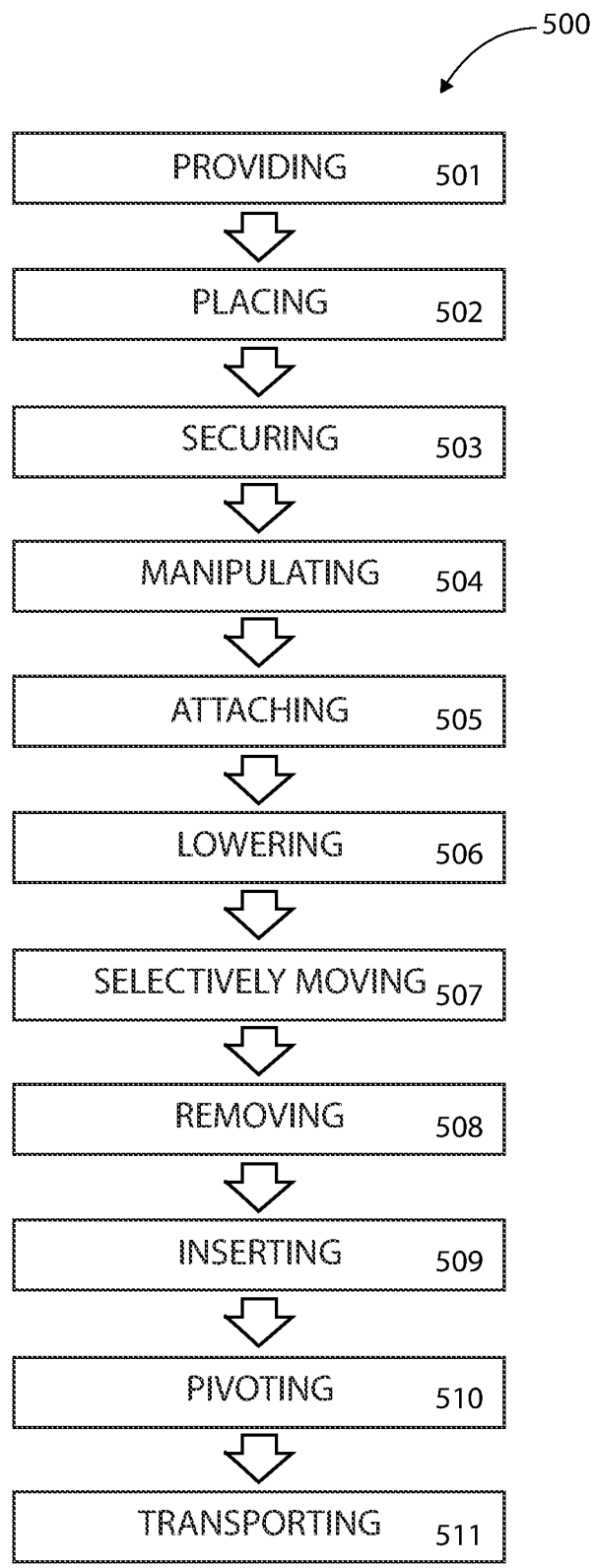
FIG. 13 is a flow diagram illustrating a method of using a tip-up system, according to an embodiment of the present disclosure.

Referring now to FIG. 13 showing a flow diagram illustrating a method 500 for using a tip-up system for ice fishing, according to an embodiment of the present disclosure. In particular, the method 500 may include one or more components or features of the tip-up system 100 as described above. As illustrated, the method of use 500 may include the steps of: step one 501, providing the tip-up system as above; step two 502, placing the base over the ice surface; step three 503, securing the base to the ice surface using the at least one anchor point; step four 504, manipulating the second stand portion to adjust height of the telescopic stand; step five 505, attaching the fishing line to the paddle with fishing hook hanging over the front paddle end; step six 506, lowering the fishing hook into the body of water; and step seven 507, selectively moving the pivot bar along the elongated horizontal (adjusting the balance point of the paddle) until the paddle is placed into the balanced position. Further steps may include: step eight 508, removing the fishing hook from the body of water when desired; step nine 509, inserting the second stand portion fully within the first stand portion; step ten 510, pivoting the telescopic stand into the collapsed position; and step eleven 511, transporting the tip-up system.

It should be noted that certain steps are optional and may not be implemented in all cases. Optional steps of method 500 are illustrated using dotted lines in FIG. 13 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a tip-up system, for balancing a paddle of a tip-up system, etc. are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A tip-up system for use in ice fishing to alert a user as to a catch status of a fishing hook, the fishing hook attached to an end of a fishing line, the tip-up system for placement over an ice surface adjacent an opening in the ice surface, the ice surface defining a horizontal axis, the opening providing access to a body of water underneath the ice surface for inserting the fishing hook thereinto for fishing, the tip-up system comprising:
  a base including a base body having a front base end opposite a rear base end, a first base side opposite a second base side, a top base surface opposite a bottom base surface, at least one stand fastener and at least one anchor point configured to facilitate fastening of the base to the ice surface, the first base side and the second base side extending between the front base end and the rear base end, the base being substantially parallel to the horizontal axis when attached thereto;
  a telescopic stand pivotably attached to the base and configured to pivot between a raised position and a collapsed position relative to the base, the telescopic stand substantially perpendicular to the base in the raised position and defining a stand axis perpendicular to the horizontal axis, the telescopic stand being substantially parallel to the base in the collapsed position, the telescopic stand including at least:
    a first stand portion having a first lower end opposite a first upper end, a first length therebetween, and a first substantially hollow interior, the first lower end including at least one base fastener for pivotably attaching the telescopic stand to the base; and
    a second stand portion having a second lower end opposite a second upper end and a second length therebetween, the second lower end attached about the first upper end of the first stand portion and configured for slidable insertion into the first substantially hollow interior, thereby adjusting a height of the telescopic stand;
  a paddle fastener attached atop the telescopic stand, the paddle fastener including a fastener body and at least one rounded aperture therewithin, the at least one rounded aperture defining a pivot axis at least substantially perpendicular to the stand axis; and
  a paddle configured to receive the fishing line, the paddle including a paddle body having a front paddle end opposite a rear paddle end, a first paddle side opposite a second paddle side extending between the front paddle end and the rear paddle end, a top paddle surface opposite a bottom paddle surface, an elongated horizontal cavity disposed within the paddle body and extending through the first paddle side and the second paddle side, and a pivot bar attached within the elongated horizontal cavity, the front paddle end being oriented proximal to the opening in the ice surface and configured to hold the fishing hook in the body of water, the pivot bar configured to sit within the at least one rounded aperture such that the paddle is able to pivot about the pivot axis between a balanced position and a tipped position, the pivot bar further configured for linear movement along the elongated horizontal cavity to adjust a balance point of the paddle.

2. The tip-up system of claim 1, wherein the fastener body includes U-shape having a first arm opposite a second arm, wherein the at least one rounded aperture includes a first aperture located in the first arm of the fastener body and a second aperture located in the second arm of the fastener body, the second aperture being in line with the first aperture such that a first bar end of the pivot bar sits within the first aperture and a second bar end of the pivot bar sits within the second aperture.

3. The tip-up system of claim 1, wherein the telescopic stand further includes a third stand portion, the third stand portion including a third lower end opposite a third upper end and a third length therebetween, wherein the second stand portion includes a second substantially hollow interior, and wherein the third lower end is attached about the second upper end of the second stand portion and configured for slidable insertion into the second substantially hollow interior.

4. The tip-up system of claim 3, wherein the first stand portion includes first lockable means located about the first upper end configured for selectively locking the second stand portion relative to the first stand portion, and wherein the second stand portion includes second lockable means located about the second upper end configured for selectively locking the third stand portion relative to the second stand portion.

5. The tip-up system of claim 4, wherein the first stand portion includes a width 0.5 inches greater than a width of the second stand portion, and wherein the second stand portion includes the width 0.5 greater than a width of the third stand portion.

6. The tip-up system of claim 1, wherein the paddle includes a length of 12 inches, as measured from the front paddle end to the rear paddle end.

7. The tip-up system of claim 6, wherein the front paddle end includes three prongs.

8. The tip-up system of claim 7, wherein a middle prong of the three prongs is weighted.

9. The tip-up system of claim 8, wherein the rear paddle end includes two flaps.

10. The tip-up system of claim 9, wherein the elongated horizontal cavity includes a length of between 3-4 inches, and a height of ⅛ inches.

11. The tip-up system of claim 1, wherein the base includes a raised section, and wherein the at least one stand fastener is attached to the raised section.

12. The tip-up system of claim 11, wherein the at least one stand fastener includes two protrusions located on opposite sides of the raised section.

13. The tip-up system of claim 12, wherein the at least one base fastener includes two pivot arms located on opposite sides of the first stand portion, and wherein the two pivot arms are each configured to attach to one of the two protrusions.

14. The tip-up system of claim 13, wherein the base includes a length of 12 inches, as measured from the front base end to the rear base end, and wherein the base includes a width of 6 inches, as measured from the first base side to the second base side.

15. The tip-up system of claim 14, wherein the at least one anchor point includes two rings located opposite each other toward the rear base end.

16. The tip-up system of claim 15, wherein the at least one anchor point further includes two apertures located opposite each other toward the rear base end.

17. A tip-up system for use in ice fishing to alert a user as to a catch status of a fishing hook, the fishing hook attached to an end of a fishing line, the tip-up system for placement over an ice surface adjacent an opening in the ice surface, the ice surface defining a horizontal axis, the opening providing access to a body of water underneath the ice surface for inserting the fishing hook thereinto for fishing, the tip-up system comprising:
  a base including a base body having a front base end opposite a rear base end, a first base side opposite a second base side, a top base surface opposite a bottom base surface, a raised section, two protrusions located on opposite sides of the raised section, and at least one of two rings located opposite each other toward the rear base end and two apertures located opposite each other toward the rear base end, the at least one of the two rings and the two apertures configured to facilitate fastening of the base to the ice surface, the first base side and the second base side extending between the front base end and the rear base end, the base being substantially parallel to the horizontal axis when attached thereto;
  a telescopic stand pivotably attached to the base and configured to pivot between a raised position and a collapsed position relative to the base, the telescopic stand substantially perpendicular to the base in the raised position and defining a stand axis perpendicular to the horizontal axis, the telescopic stand being substantially parallel to the base in the collapsed position, the telescopic stand including:
    a first stand portion having a first lower end opposite a first upper end, a first length therebetween, and a first substantially hollow interior, the first lower end including two pivot arms located on opposite sides of the first stand portion, the two pivot arms each configured to attach to one of the two protrusions for pivotably attaching the telescopic stand to the base;
    a second stand portion having a second lower end opposite a second upper end, a second length therebetween, and a second substantially hollow interior, the second lower end attached about the first upper end of the first stand portion and configured for slidable insertion into the first hollow interior, thereby adjusting a height of the telescopic stand;
    third stand portion having a third lower end opposite a third upper end and a third length therebetween, the third lower end attached about the second upper end of the second stand portion and configured for slidable insertion into the second substantially hollow interior, thereby adjusting the height of the telescopic stand;
    wherein the first stand portion includes first lockable means located about the first upper end configured for selectively locking the second stand portion relative to the first stand portion; and
    wherein the second stand portion includes second lockable means located about the second upper end configured for selectively locking the third stand portion relative to the second stand portion;
  a paddle fastener attached atop the telescopic stand, the paddle fastener including a fastener body including a U-shape having a first arm opposite a second arm, a first aperture located in the first arm of the fastener body and a second aperture located in the second arm of the fastener body, the second aperture being in line with the first aperture, the first aperture and the second aperture together defining a pivot axis at least substantially perpendicular to the stand axis; and
  a paddle configured to receive the fishing line, the paddle including a paddle body having a front paddle end opposite a rear paddle end, a first paddle side opposite a second paddle side extending between the front paddle end and the rear paddle end, a top paddle surface opposite a bottom paddle surface, an elongated horizontal cavity disposed within the paddle body and extending through the first paddle side and the second paddle side, and a pivot bar attached within the elongated horizontal cavity, the front paddle end including three prongs, the rear paddle end including two flaps, a middle prong of the three prongs being weighted, the front paddle end being oriented proximal to the opening in the ice surface and configured to hold the fishing hook in the body of water, a first bar end of the pivot bar configured to sit within the first aperture and a second bar end of the pivot bar configured to sit within the second aperture such that the paddle is able to pivot about the pivot axis between a balanced position and a tipped position, the pivot bar further configured for linear movement along the elongated horizontal cavity to adjust a balance point of the paddle.

18. The tip-up system of claim 17, wherein the first stand portion includes a width 0.5 inches greater than a width of the second stand portion, wherein the second stand portion includes the width 0.5 greater than a width of the third stand portion, wherein the paddle includes a length of 12 inches, as measured from the front paddle end to the rear paddle end, wherein the elongated horizontal cavity includes a length of between 3-4 inches, and a height of ⅛ inches, and wherein the base includes a length of 12 inches, as measured from the front base end to the rear base end, and wherein the base includes a width of 6 inches, as measured from the first base side to the second base side.

19. A method of using a tip-up system ice fishing to alert a user as to a catch status of a fishing hook, the fishing hook attached to an end of a fishing line, the tip-up system for placement over an ice surface adjacent an opening in the ice surface, the ice surface defining a horizontal axis, the opening providing access to a body of water underneath the ice surface for inserting the fishing hook thereinto for fishing, the method comprising the steps of:

provide the tip-up system including:

a base including a base body having a front base end opposite a rear base end, a first base side opposite a second base side, a top base surface opposite a bottom base surface, at least one stand fastener and at least one anchor point configured to facilitate fastening of the base to the ice surface, the first base side and the second base side extending between the front base end and the rear base end, the base being substantially parallel to the horizontal axis when attached thereto;

a telescopic stand pivotably attached to the base and configured to pivot between a raised position and a collapsed position relative to the base, the telescopic stand substantially perpendicular to the base in the raised position and defining a stand axis perpendicular to the horizontal axis, the telescopic stand being substantially parallel to the base in the collapsed position, the telescopic stand including at least:

a first stand portion having a first lower end opposite a first upper end, a first length therebetween, and a first substantially hollow interior, the first lower end including at least one base fastener for pivotably attaching the telescopic stand to the base; and a second stand portion having a second lower end opposite a second upper end and a second length therebetween, the second lower end attached about the first upper end of the first stand portion and configured for slidable insertion into the first substantially hollow interior, thereby adjusting a height of the telescopic stand;

a paddle fastener attached atop the telescopic stand, the paddle fastener including a fastener body and at least one rounded aperture therewithin, the at least one rounded aperture defining a pivot axis at least substantially perpendicular to the stand axis; and a paddle configured to receive the fishing line, the paddle including a paddle body having a front paddle end opposite a rear paddle end, a first paddle side opposite a second paddle side extending between the front paddle end and the rear paddle end, a top paddle surface opposite a bottom paddle surface, an elongated horizontal cavity disposed within the paddle body and extending through the first paddle side and the second paddle side, and a pivot bar attached within the elongated horizontal cavity, the front paddle end being oriented proximal to the opening in the ice surface and configured to hold the fishing hook in the body of water, the pivot bar configured to sit within the at least one rounded aperture such that the paddle is able to pivot about the pivot axis between a balanced position and a tipped position, the pivot bar further configured for linear movement along the elongated horizontal cavity to adjust a balance point of the paddle;

placing the base over the ice surface;

securing the base to the ice surface using the at least one anchor point;

manipulating the second stand portion to adjust height of the telescopic stand;

attaching the fishing line to the paddle with fishing hook hanging over the front paddle end;

lowering the fishing hook into the body of water; and selectively moving the pivot bar along the elongated horizontal until the paddle is placed into the balanced position.

20. The method of claim 19, further comprising the steps of:

removing the fishing hook from the body of water when desired;

inserting the second stand portion fully within the first stand portion;

pivoting the telescopic stand into the collapsed position; and transporting the tip-up system.

* * * * *